(12) United States Patent
Nakashima et al.

(10) Patent No.: US 7,824,791 B2
(45) Date of Patent: Nov. 2, 2010

(54) ELECTRONIC APPARATUS

(75) Inventors: Motohiro Nakashima, Aichi (JP);
Masaki Suenaga, Aichi (JP)

(73) Assignee: Sony Corporation, Tokyo (JP)

( * ) Notice: Subject to any disclaimer, the term of this patent is extended or adjusted under 35 U.S.C. 154(b) by 939 days.

(21) Appl. No.: 11/703,281

(22) Filed: Feb. 7, 2007

(65) Prior Publication Data

US 2007/0196726 A1    Aug. 23, 2007

(30) Foreign Application Priority Data

Feb. 9, 2006    (JP) .............................. 2006-032058

(51) Int. Cl.
*H01M 2/10*    (2006.01)
(52) U.S. Cl. ........................................ 429/96; 429/100
(58) Field of Classification Search .................... 429/96, 429/99, 100
See application file for complete search history.

(56) References Cited

U.S. PATENT DOCUMENTS 5,631,098 A * 5/1997 Suzuki ........................... 429/1

2006/0178040 A1* 8/2006 Kurosawa .................... 439/500
2006/0202659 A1* 9/2006 Nagano ........................ 320/112

FOREIGN PATENT DOCUMENTS

JP    2001 223480    8/2001

* cited by examiner

*Primary Examiner*—Patrick Ryan
*Assistant Examiner*—Muhammad Siddiquee
(74) *Attorney, Agent, or Firm*—Frommer Lawrence & Haug LLP; William S. Frommer

(57) ABSTRACT

An electronic apparatus includes an outer housing; a battery storage compartment provided in the outer housing and having a height and a width and depth larger than the height; a cover for opening and closing an opening of the battery storage compartment; and a battery ejecting spring disposed in a deep portion of the battery storage compartment and for urging a battery being stored in the battery storage compartment along a direction of ejection of the battery from the opening. The battery ejecting spring includes a pivot shaft, an anchor shaft, and an urging shaft. The pivot shaft extends along the width direction. The anchor shaft stops the rotation of the one end portion of the pivot shaft. The urging shaft includes a tip end engaging with an end face of the battery, thereby to perform a pivotal movement about the pivot shaft working as a fulcrum.

9 Claims, 16 Drawing Sheets

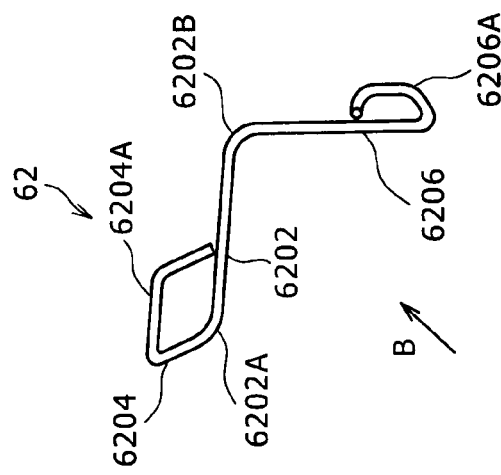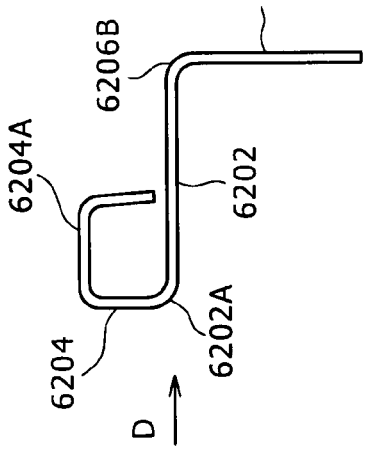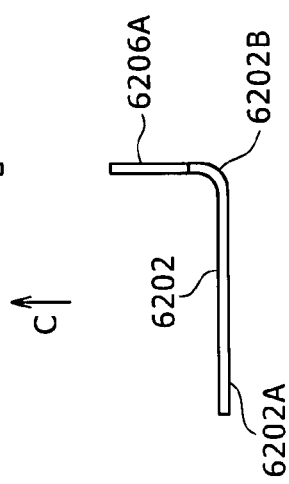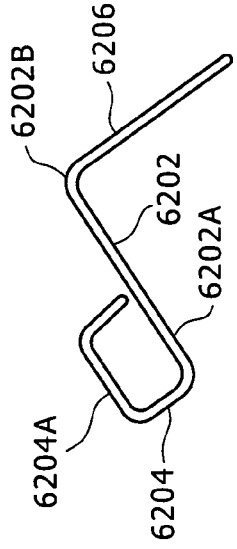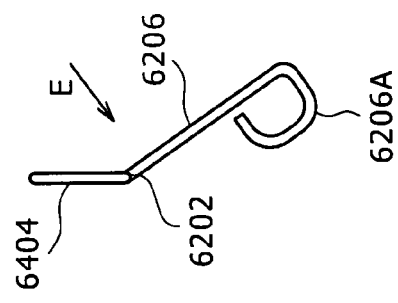

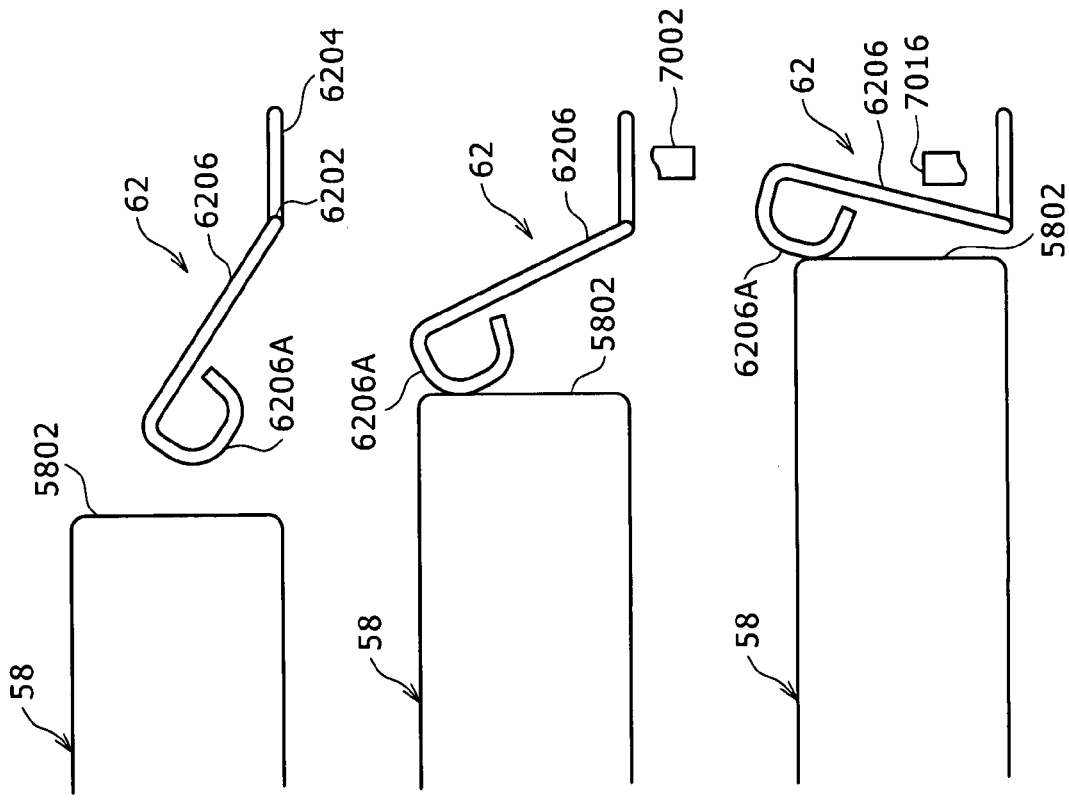

ELECTRONIC APPARATUS

CROSS REFERENCES TO RELATED APPLICATIONS

The present invention contains subject matter related to Japanese Patent Application JP 2006-032058 filed in the Japanese Patent Office on Feb. 9, 2006, the entire contents of which being incorporated herein by reference.

BACKGROUND OF THE INVENTION

1. Field of the Invention

The present invention relates to an electronic apparatus.

2. Description of the Related Art

An electronic apparatus, such as a digital still camera, includes, a battery storage compartment for storing a battery and provided in an outer housing; a cover for opening and closing the battery storage compartment; and a battery ejecting spring for ejecting a battery stored in the battery storage compartment when the battery storage compartment is opened by the cover.

According to existing techniques, a compression coil spring is used as a battery ejecting spring (as disclosed in Japanese Unexamined Patent Application Publication No. 2001-223480).

However, such a compression coil spring uses a large space in a battery attachment/detachment direction, such that the spring is disadvantageous for physical compactness of the battery storage compartment.

Further, when the compression coil spring is compressed, a locally large force is exerted on a portion of a wall portion, which corresponds to the outside diameter of the compression coil spring in a wall portion of the battery storage compartment, which portion bears the opposing force of the compression coil spring. As such, in a configuration in which the housing constituting the battery storage compartment is formed of a synthetic resin, there is concern about deterioration caused due to creep or the like on the opposing-force bearing portion of the wall portion of the battery storage compartment.

To overcome such deterioration, needs arises, as disadvantages, in that, for example, the thickness of the wall portion has to be increased and/or a higher strength material has to be used for the wall portion. This leads to imposing constrains on the design of the wall portion forming the battery storage compartment.

SUMMARY OF THE INVENTION

The present invention is made in view of the circumstances such as described above. Accordingly, it would be desirable to provide an electronic apparatus that enables implementing physical compactness of a battery storage compartment of the apparatus and that is advantageous for securing a sufficient degree of design freedom.

In order to achieve the above-described, according to an embodiment of the present invention, an electronic apparatus includes an outer housing; a battery storage compartment provided in the outer housing and having a height and a width and depth larger than the height; a cover for opening and closing an opening of the battery storage compartment; and a battery ejecting spring disposed in a deep portion of the battery storage compartment and for urging a battery being stored in the battery storage compartment along a direction of ejection of the battery from the opening. The battery ejecting spring is a torsion spring including a pivot shaft linearly extending, an anchor shaft provided to one end portion of the pivot shaft, and an urging shaft provided to an other end portion of the pivot shaft. The pivot shaft is supported by a wall portion to extend along the direction of the width of the battery storage compartment, the wall portion forming the battery storage compartment. The anchor shaft is anchored to a wall portion to stop rotation of the one end portion of the pivot shaft, the wall portion forming the battery storage compartment. The urging shaft includes a tip end opposing the deep portion of the battery storage compartment and engaging with an end face of the battery being stored in the battery storage compartment, thereby to perform a pivotal movement about the pivot shaft working as a fulcrum.

According to the embodiment, the battery ejecting spring is configured such that the urging shaft pivotally moves about the pivot shaft working as the fulcrum, and the urging shaft deflects at a large stroke along the direction of the insertion and removal of the battery. Consequently, compared to the related art case using the compression coil spring, a large space need not be provided in the direction of the insertion and removal of the battery, but the battery ejecting spring can be disposed. This is advantageous to implement the physical compactness of the battery storage compartment.

Further, opposing forces of the battery ejecting spring are mainly received by an anchor shaft receiving groove, but are distributed to act on a pivot shaft receiving groove and the anchor shaft receiving groove. As such, unlike the related art case, the opposing forces do not locally act a depth-side wall of a housing. Consequently, the battery storage compartment can be designed without such strength constraints.

BRIEF DESCRIPTION OF THE DRAWINGS

Embodiments of the present invention will be described in detail based on the following figures, wherein:

FIG. 14A is a perspective view of the battery ejecting spring;

FIG. 14B is a view in the direction shown by an arrow B of FIG. 14A;

FIG. 14C is a view in the direction shown by an arrow C of FIG. 14B;

FIG. 14D is a view in the direction shown by an arrow D of FIG. 14B;

FIG. 14E is a view in the direction shown by an arrow E of FIG. 14D;

FIGS. 17A to 17C, respectively, explanatory views showing deflection of the battery ejecting spring.

DESCRIPTION OF THE PREFERRED EMBODIMENTS

First Embodiment

A first embodiment of the present invention will be described herebelow with reference to the drawings.

The present embodiment will be described with reference to the case of an electronic apparatus is configured from an image capture apparatus.

Figure 1:
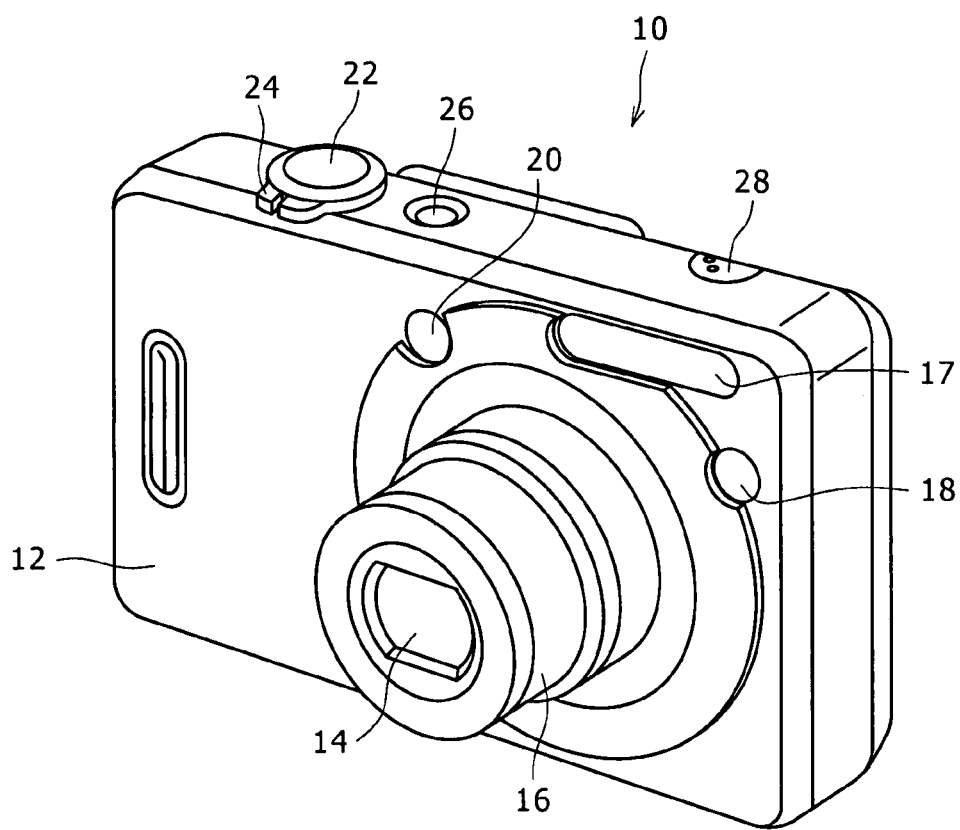
FIG. 1 is a perspective view, as viewed from the front, showing an image capture apparatus of a first embodiment of the present invention.
Figure 2A:
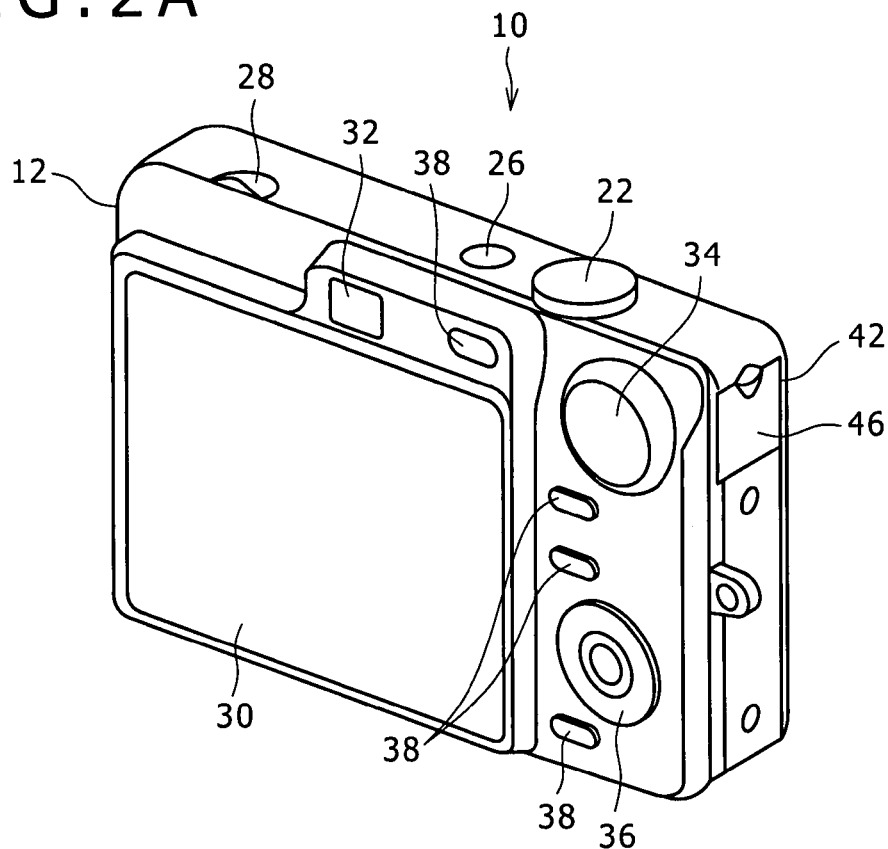
FIG. 2A is a perspective view, as viewed from the rear, showing the image capture apparatus.
Figure 2B:
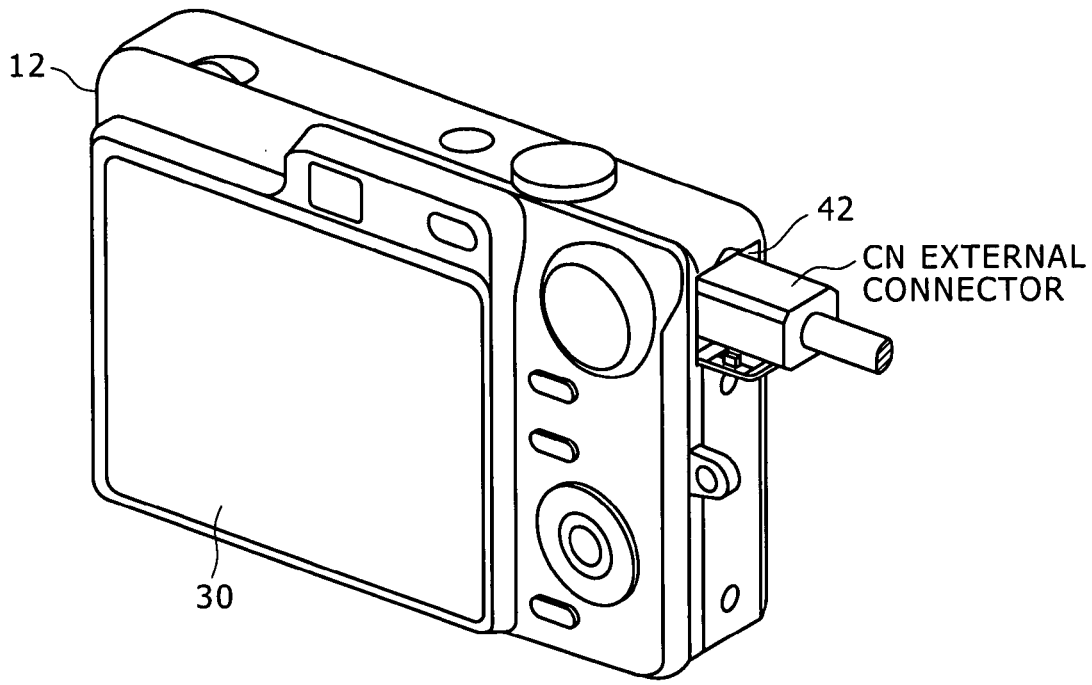
FIG. 2B is a perspective view showing the image capture apparatus to which a connector is attached.
Figure 3:
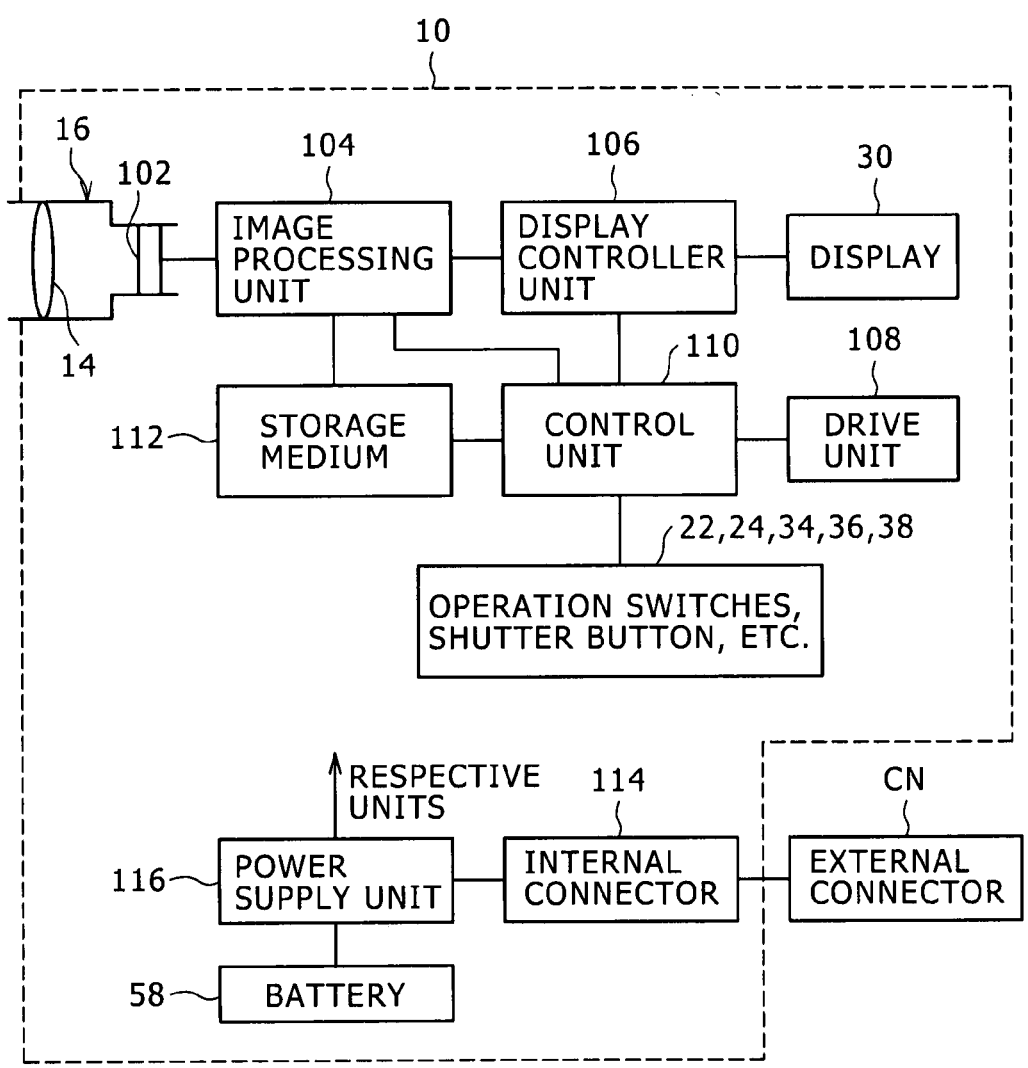
FIG. 3 is a block diagram showing the configuration of the image capture apparatus.

FIG. 1 is a perspective view, as viewed from the rear, of an image capture apparatus 10 in accordance with a first embodiment of the present invention. FIG. 2A is a perspective view, as viewed from the rear, showing the image capture apparatus 10. FIG. 2B is a perspective view showing the image capture apparatus 10. FIG. 3 is a block diagram showing the configuration of the image capture apparatus 10.

With reference to FIG. 1, the image capture apparatus 10 in accordance with the present invention is a digital still camera, and has a outer housing 12 having a substantially thin rectangular parallelopiped shape and constituting an exterior housing.

The outer housing 12 has a height in the up-and-down (or top-and-bottom or vertical) direction that is larger than a thickness in a frontward-rearward direction. In addition, the outer housing 12 has a width in a rightward-leftward direction that is larger than the height in the vertical direction.

In the present Specification, the left and right (or, lefthand and righthand) direction refers to the direction in the state that the image capture apparatus 10 is viewed from the front. The side of a photographic subject along the direction of the optical axis of an optical system (of the image capture apparatus 10) is referred to by using the term "front." The side of an image capture element of the image is referred to by using the term "rear" (or, "back").

As shown in FIG. 1, a collapsible (extendable and retractable) lens barrel 16 holding and storing a photography optical system 14 is provided in a portion close to a front and righthand portion of the outer housing 12.

As shown in FIG. 1, the lens barrel 14 is configured such that it is driven by a drive unit 108 (refer to FIG. 3) built in an interior of the outer housing 12 to be able to perform extention and retraction movements between a usage position and an accommodation position (in a collapsed mode). The usage position refers to the position in any one of operation modes (a wide angle mode, a telephoto mode, and a middle mode between the wide and telephoto modes) projecting from the front face of the outer housing 12 and an accommodation position (in a collapsed mode).

The front face of the outer housing 12 is provided with a flashlight 17 for emitting flashlight onto photographic subject (s); an LED lamp 18 for emitting autofocusing auxiliary light and light indicative of an operational state of a self-timer; and an objective lens 20 constituting an optical viewfinder.

An upper end face of the outer housing 12 has a shutter button 22, a zoom lever 24, a power switch 26, and a microphone 28.

With reference to FIG. 2A, the rear face of the outer housing 12 has components such as listed hereinbelow. They are a display 30 for displaying screens, such as captured images and various menu screens; an ocular window 32 constituting the optical viewfinder; an operation dial 34 for shifting among modes, such as an image capture mode and a playback mode; a cross-shaped operation button 36 for shifting among, various setup screens regarding image capture and menu screens; a plurality of operation switches 38 for performing various operations such as menu screen retrieval; and a speaker 40.

Further, with reference to FIGS. 2A and 2B, the upper portion of the left lateral surface of the outer housing 12 has a connector storage compartment 42 to and from which an external connector CN of an external device (not shown) provided externally of the image capture apparatus 10 are inserted and removed.

An internal connector 114 (refer to FIG. 3) to be electrically connected to the external connector CN is provided in a deep portion of the connector storage compartment 42.

Figure 10:
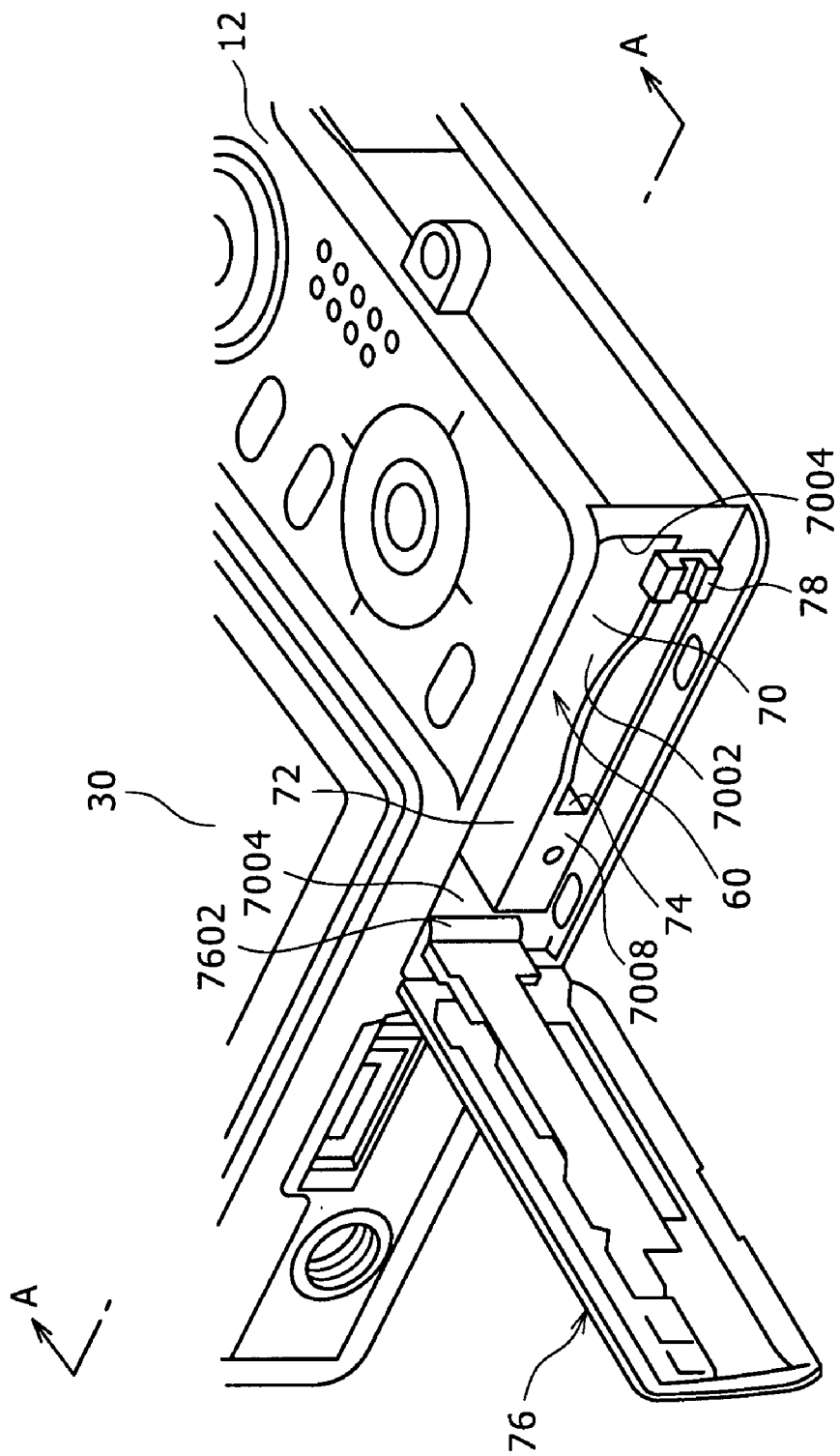
FIG. 10 is a perspective view of a vicinity of a battery storage compartment of an image capture apparatus.

With reference to FIG. 10, a battery storage compartment 60 for storing a battery 58 (refer to FIGS. 15 and 16) is provided in the left of a lower portion of the outer housing 12.

With reference to FIG. 3, the image capture apparatus 10 includes, but not limited to, an image capture element 102, an image processing unit 104, a display controller unit 106, a drive unit 108, a control unit 110. The image capture element 102 is disposed in a rear end portion of the lens barrel 16, includes, for example, a CCD (charge coupled device), which captures a photographic subject image imaged by the photography optical system 14, and a CMOS sensor. The image processing unit 104 generates image data in accordance with an image capture signal output from the image capture element 102 and that records (stores) the image data into a storage medium 112, such as a memory card. The display controller unit 106 displays the image data on a display 30. The drive unit 108 performs drive operations for, for example, extention/retraction operation and zooming operation of the lens barrel 16. The control unit 110 includes a CPU (control processing unit), and controls the image processor 104, the display controller unit 106, and the drive unit 108 in response to operations of the above-described shutter button 22, zoom lever 24, operation dial 34, cross-shaped operation button 36, and operation switches 38.

Further, the image capture apparatus 10 includes a power supply unit 116 that regulates DC power, which is input from the external connector CN through the internal connector 114, to a predetermined voltage and current. In addition, the power supply unit 116 supplies power to, for example, the image capture element 102, the image processor 104, the display controller unit 106, the drive unit 108, and the control unit 110.

Figure 4:
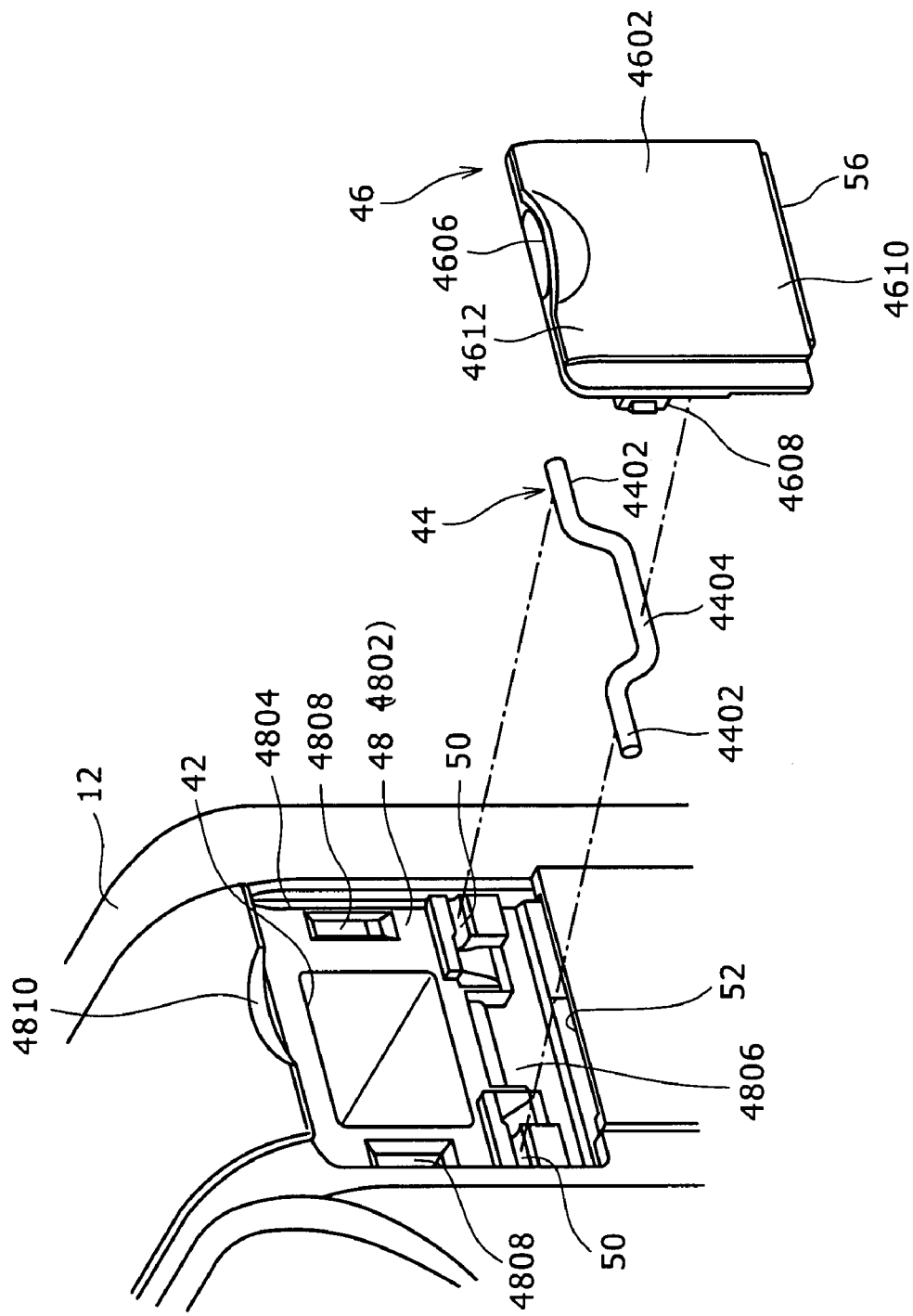
FIG. 4 is an exploded perspective view showing a mounting structure of an open and close cover.
Figure 5:
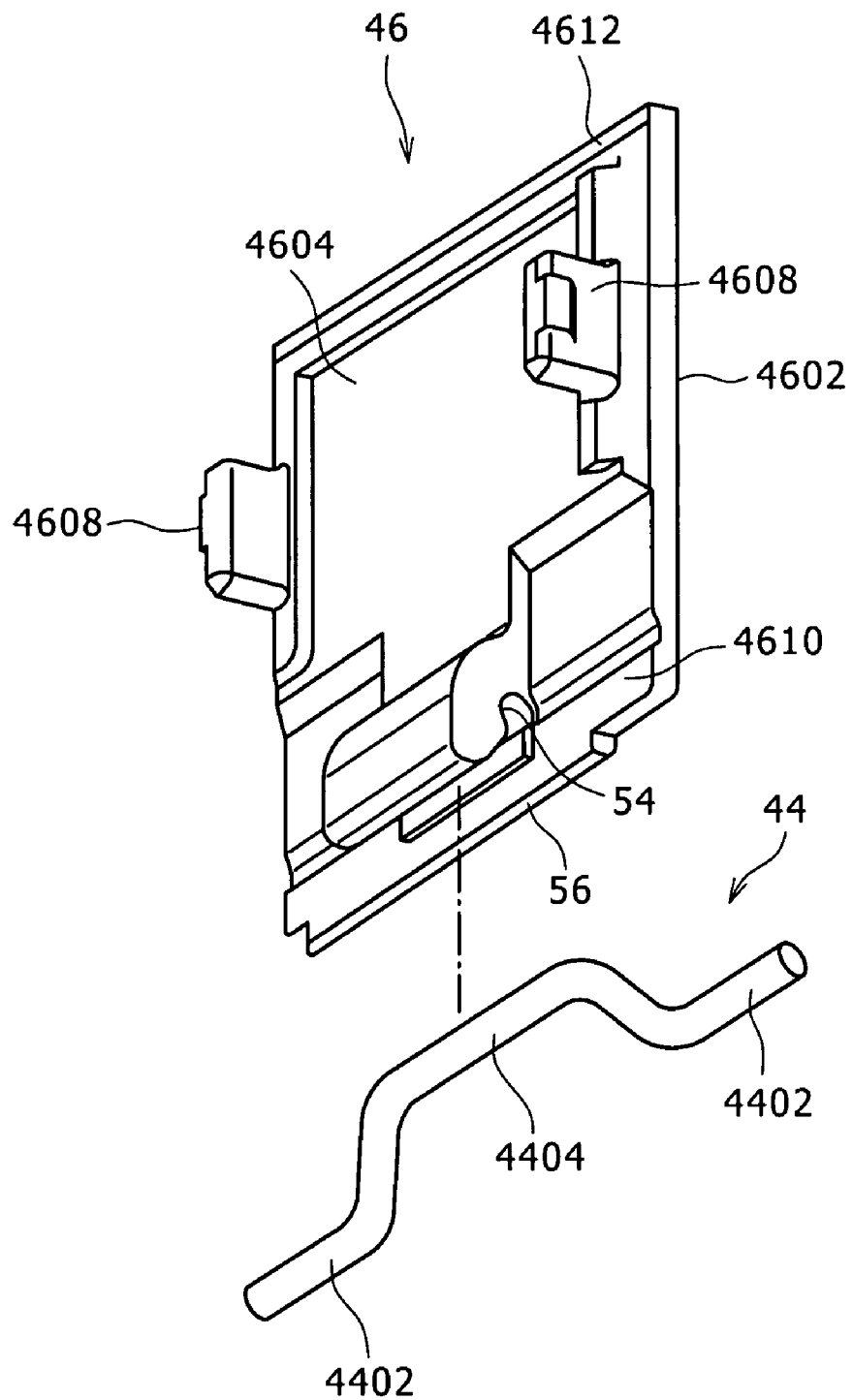
FIG. 5 is an exploded perspective view showing a mounting structure of the open and close cover.
Figure 6A:
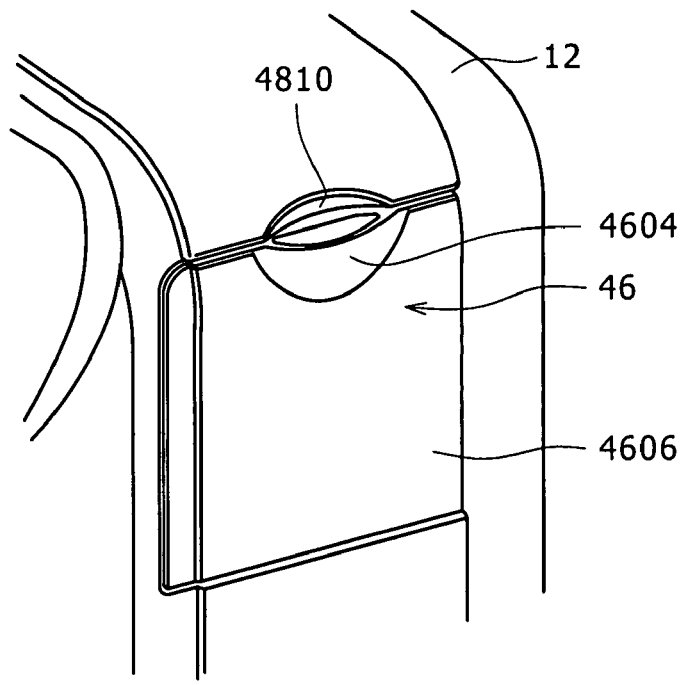
FIG. 6A is a perspective view showing a closed state of the open and close cover.
Figure 6B:
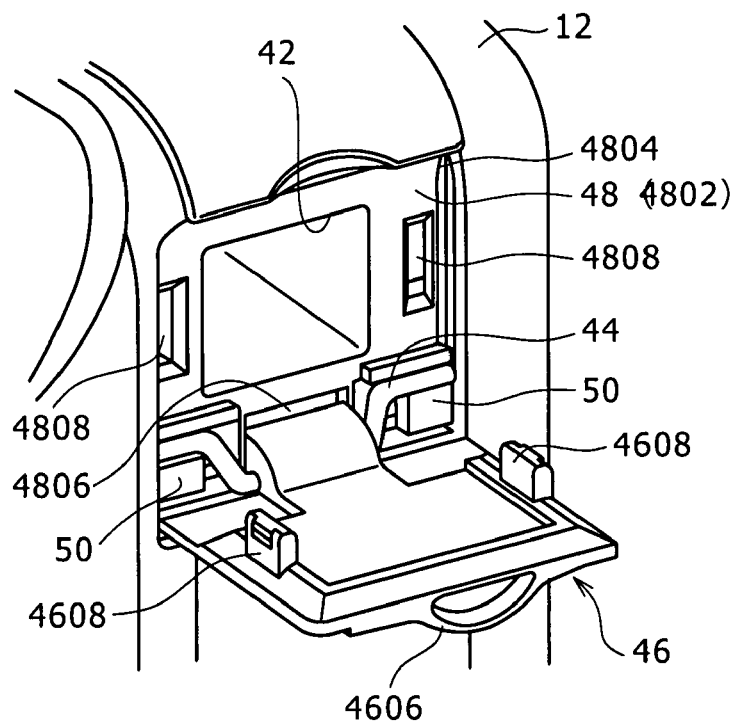
FIG. 6B is a perspective view showing an open state of the open and close cover.
Figure 7:
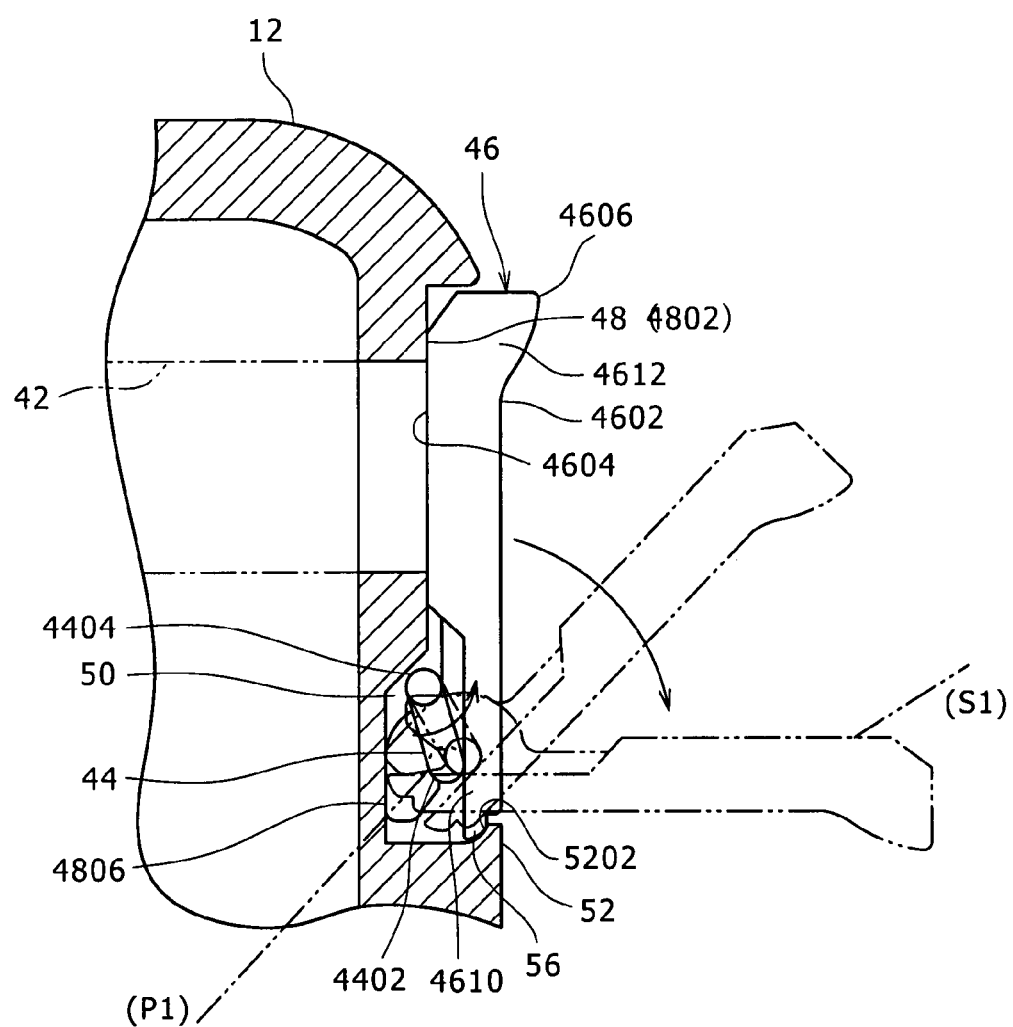
FIG. 7 is a view showing the closed state and a first open state of the open and close cover.
Figure 8:
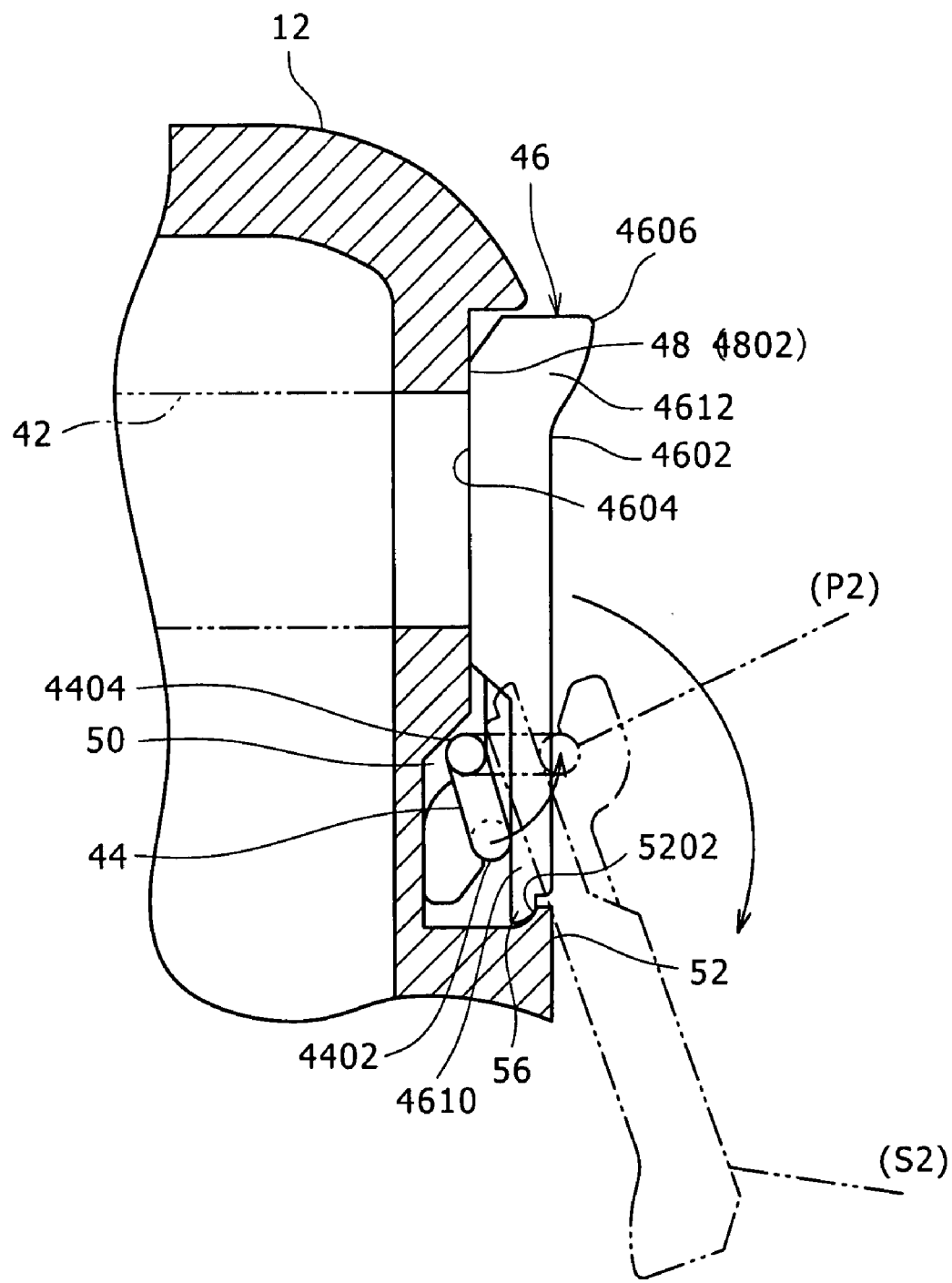
FIG. 8 is a view showing the closed state and a second open state of the open and close cover.

FIGS. 4 and 5 are exploded perspective views showing a mounting structure of an open and close cover 46. FIG. 6A is a perspective view showing a closed state of the open and close cover 46. FIG. 6B is a perspective view showing an open state of the open and close cover 46. FIG. 7 is a view showing the closed state and a first open state of the open and close cover 46. FIG. 8 is a view showing the closed state and a second open state of the open and close cover 46.

The connector storage compartment 42 is opened and closed by the open and close cover 46 that pivotally moves about a pivot shaft 44 (working as a fulcrum) supported by the outer housing 12. The structure for the opening and closing operation (opening and closing structure) will be described further herebelow.

As shown in FIGS. 4 and 6 to 8, a recess portion 48 opened outward and extending to the periphery of the connector storage compartment 42 is provided in a portion of the left lateral surface of the outer housing 12. The recess portion 48 has a bottom wall 4802 and a sidewall 4804 elevating from the periphery of the bottom wall 4802.

Groove-shaped bearing portions 50, respectively, are provided in two portions of the bottom wall 4802 located in a lower portion of the connector storage compartment 42. Further, a base-portion storing recess portion 4806 for storing a base portion of the open and close cover 46 is provided in a portion of the bottom wall 4802 between the bearing portions 50.

Engagement recess portions 4808, respectively, are provided in portions of bottom wall 4802, which are located in the front and rear of the connector storage compartment 42.

A finger-touch recess portion 4810 is provided in an edge portion of the sidewall 4804, which is located above the connector storage compartment 42.

Further, as shown in FIGS. 7 and 8, a housing-side protrusion 52 is provided in an edge portion of the sidewall 4804, which is located below the connector storage compartment 42.

A guide surface 5202 is formed on a surface where the housing-side protrusion 52 opposes the recess portion 48.

As shown in FIGS. 4 and 5, the pivot shaft 44 has first portions 4402 and a second shaft portion 4404. The first portions 4402 are located to extend along the long-side direction of both ends. The second shaft portion 4404 is provided between the first shaft portions 4402 to be spaced apart perpendicularly from the extension direction of the first shaft portions 4402 and to extend parallel to the first shaft portions 4402. The pivot shaft 44 is disposed in the manner that the first shaft portions 4402 at two ends of thereof are rotatably journaled by the respective bearing portions 50.

As shown in FIG. 7, the second shaft portion 4404 is disposed such that it can be located in a first position (P1) that is more apart from the connector storage compartment 42 than the respective first shaft portion 4402 and that is proximity to the bottom wall 4802 of the recess portion 48. In addition, as shown in FIG. 8, the second shaft portion 4404 is disposed such that it can be located in a second position (P2) that is most apart from the bottom wall 4802 of the recess portion 48.

The open and close cover 46 has a rectangular shape corresponding to the contour of the recess portion 48. When the open and close cover 46 closes the connector storage compartment 42, it closes also the recess portion 48 in synchronization.

As shown in FIGS. 7 and 8, the open and close cover 46 has a rear side 4602 opposing the bottom wall 4802 of the recess portion 48 and a front side 4604 opposing the outside when the connector storage compartment 42 and the recess portion 48 are closed.

As shown in FIG. 5, a groove-shaped bearing portion 54 in which the second shaft portion 4404 is rotatably fitted is provided on one side of the rear side 4602. The open and close cover 46 is disposed in the outer housing 12 in the manner that the second shaft portion 4404 is rotatably fitted into the bearing portion 54.

As shown in FIGS. 7 and 8, the open and close cover 46 is configured as follows. A portion supported by the second shaft portion 4404 is used as a base portion 4610. A portion most apart from the base portion 4610 is used as a free end 4612. A finger-touch protrusion 4606 is provided in a portion of the front side 4604, which is located in the free end 4612. The protrusion 4606 is located in a portion opposing the finger-touch recess portion 4810 when the connector storage compartment 42 is closed by the open and close cover 46.

As shown in FIG. 5, engagement protrusion portions 4608 for engaging with (and disengages from) the respective engagement recess portions 4808 are provided in two portions of the rear side 4602. Further, the open and close cover-side protrusion 56 engageable with a guide surface 5202 is provided in an end portion of the base portion 4610 which is located opposite the free end 4612.

As shown in FIG. 7, the open and close cover 46 opens and closes the recess portion 48 and the connector storage compartment 42 in the manner that the free end 4612 pivotally moves about the second shaft portion 4404 (working as a fulcrum) in the state where the second shaft portion 4404 is located at the first position (P1). In this configuration, the engagement protrusions 4608 engages the respective engagement recess portions 4808 in the state where the recess portion 48 and the connector storage compartment 42 are closed, whereby forming the closed state of the connector storage compartment 42 by using the open and close cover 46.

In the closed state, the open and close cover-side protrusion 56 is located inward of the housing-side protrusion 52; or in other words, the open and close cover-side protrusion 56 is covered by the housing-side protrusion 52. Consequently, while the open and close cover 46 pivotally moves about the fulcrum located within the recess portion 48, the closed state of the connector storage compartment 42 is formed without causing a large clearance between the open and close cover 46 and the recess portion 48.

As shown in FIG. 6A, in the closed state, the front side 4604 of the open and close cover 46 and the left lateral surface of the outer housing 12 are located on the same plane.

As shown in FIG. 7, in the event of closure of the connector storage compartment 42, the open and close cover-side protrusion 56 is guided by the guide surface 5202 to the closure direction, whereby the close movement of the open and close cover 46 is smoothly performed.

As shown in FIG. 7, a first open state (S1) is formed in which, in the state where the second shaft portion 4404 is located in the first position (P1), the open and close cover 46 opens in the direction to be apart from the connector storage compartment 42, and the open and close cover 46 extends along the direction perpendicular to the bottom wall 4802.

Further, when the open and close cover 46 is withdrawn, then the second shaft portion 4404 rotates about the first shaft portions 4402, and the second shaft portion 4404 is located in the second position (P2), as shown in FIG. 8. In this state, the open and close cover 46 can be opened to be larger than in the first open state (S1) along the direction to be apart from the connector storage compartment 42. In this case, as shown by an imaginary line in FIG. 8, a second open state (S2) is formed in which the open and close cover 46 is moved or fell down onto the left lateral surface of the outer housing 12.

The opening and closing structure of he open and close cover 46, which is formed as described above, offers advantages described herebelow.

In the state of the second shaft portion 4404 located in the first position (P1), opening and closing of the connector storage compartment 42 are performed by the pivotal movement of the open and close cover 46.

In the open/close state of the connector storage compartment 42, the open and close cover-side protrusion 56 is covered by the housing-side protrusion 52. As such, the recess portion 48 is completely closed (over all circumferences thereof) with no clearance by the open and close cover 46. Further, the front side 4604 of the open and close cover 46 and the left lateral surface of the outer housing 12 are located on the same plane, thereby offering an advantage for improving the appearance quality.

Further, in the open state of the connector storage compartment 42, the open and close cover 46 is spaced apart from the connector storage compartment 42, and insertion and removal of the external connector CN into and from the connector storage compartment 42 are performed with no problems.

Further, in the event of closure of the connector storage compartment 42, the open and close cover-side protrusion 56 is guided by the guide surface 5202 to the closure direction. Consequently, while the second shaft portion 4404 can move between the first and second positions (P1) and (P2), it is advantageous to smoothly and securely accomplish the close movement of the open and close cover 46.

Further, in the open event, when the open and close cover 46 is pulled along a direction apart from the bottom wall 4802, the second shaft portion 4404 moves from the first position (P1) to the second position (P2). In this state, the open and close cover 46 is pivotally moved along the opening direction, thereby to form the second open state (S2). Consequently, in the state of the open and close cover 46 set to the second open state (S2), it is advantageous for even smoother insertion and removal of the external connector CN on the connector storage compartment 42.

Further, since the connector storage compartment 42 is opened and closed by the pivotal movement of the open and close cover 46, the open and close cover 46 need not be formed using an elastic material, such as an elastomer. As such, the open and close cover 46 can be formed from a same or similar material as or to that of the outer housing 12, thereby offering the advantage for improving the appearance quality. Further, the portion of the open and close cover 46 need not be disposed in an angular (or, corner) portion in the vicinity of the connector storage compartment 42, as such it is advantageous also in layout of the connector storage compartment 42.

Figure 9A:
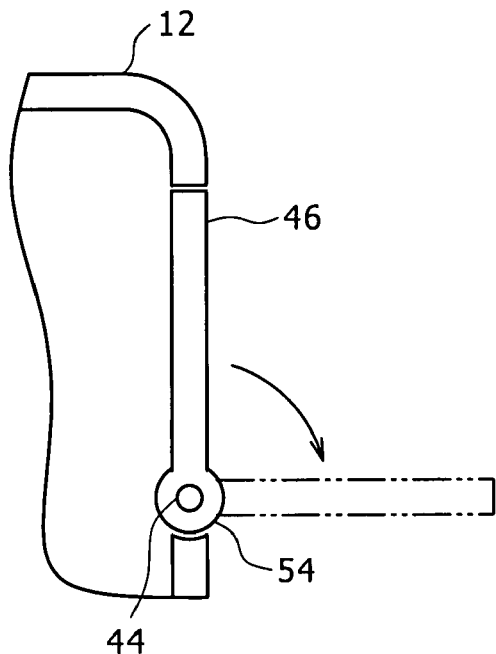
FIG. 9A is a view showing a first comparative example.
Figure 9B:
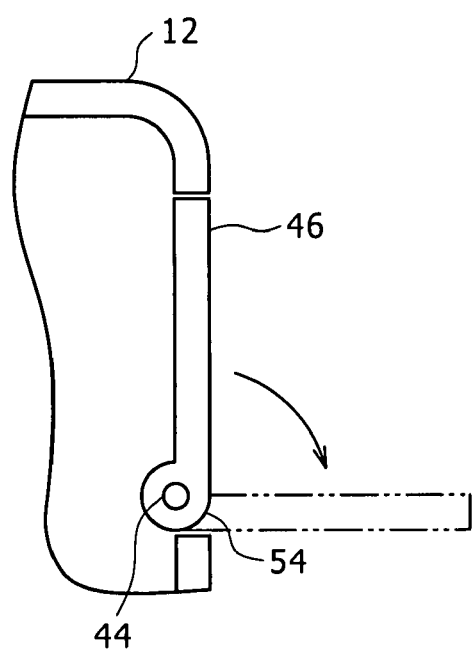
FIG. 9B is a view showing a second comparative example.
Figure 9C:
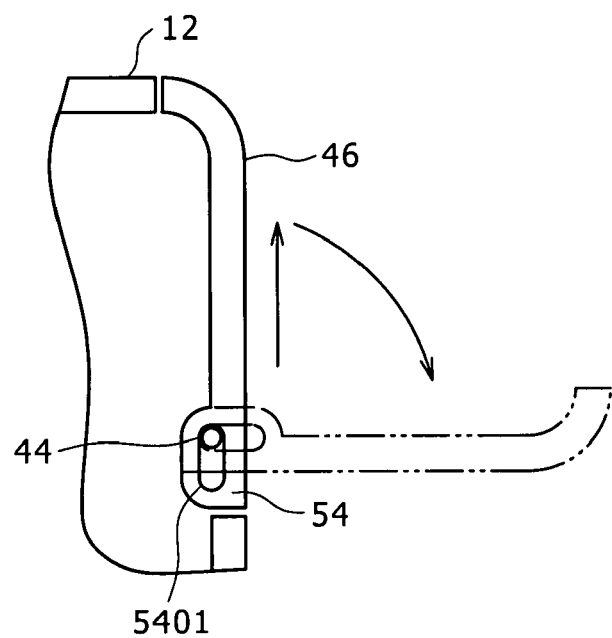
FIG. 9C is a view showing a third comparative example.

The embodiment will be further described herebelow with reference to comparative examples of FIGS. 9A to 9C that, respectively, use linearly extending pivot shafts 44.

A first comparative example shown in FIG. 9A has a configuration in which the bearing portion 54 of the open and close cover 46 is rotatably fitted on the pivot shaft 44 provided in the outer housing 12.

In the first comparative example, the pivot shaft 44 is disposed in the vicinity of the outer face of the outer housing 12. As such, as a disadvantage, the bearing portion 54 of the open and close cover 46 extends to the outside of the outer housing 12, therefore degrading the appearance quality of the outer housing 12.

In comparison, however, in the configuration described in the embodiment, the front side 4604 of the open and close cover 46 and the outer housing 12 are located on the same plane in the closed state of the connector storage compartment 42. This is advantageous for improving the appearance quality.

A second comparative example shown in FIG. 9B has a configuration in which, compared to the first comparative example, the bearing portion 54 is disposed more inwardly of the outer housing 12.

In the second comparative example, although the bearing portion 54 is not extended from the surface of the outer housing 12, the clearance between the bearing portion 54 and the edge portion of the outer housing 12 which opposes the bearing portion 54 is enlarged. This offers the disadvantage of degrading the appearance quality of the outer housing 12.

In comparison, however, in the configuration described above, in the closed state of the connector storage compartment 42, the open and close cover-side protrusion 56 is covered by the housing-side protrusion 52, the recess portion 48 is completely closed (over all circumferences thereof) by the open and close cover 46 without clearance. This is advantageous for improving the appearance quality.

In a third comparative example shown in FIG. 9C, a bore of the bearing portion 54 for insertion of the pivot shaft 44 is provided in the form of a slot-shaped bore 5401. The open and close cover 46 is slidably moved along the extension direction of the slot-shaped bore 5401, whereby opening and closing of the open and close cover 46 is performed.

In the third comparative example, the bearing portion 54 is not extended from the surface of the outer housing 12, and also the clearance between the open and close cover 46 and the edge of the outer housing 12 can be reduced in size. However, there is a disadvantage in that operation is intricate since the open and close cover 46 has to be slid in the opening and closing event. In addition, since the open and close cover 46 is provided to be slidable, the disposition location is limited to an outer housing 12 portion including an angular (or, corner) portion, therefore offering a disadvantage for securing a sufficient degree of design freedom of the connector storage compartment 42.

In comparison, in the configuration formed described above, the open and close cover 46 is pivotally moved. Consequently, the configuration is advantageous for improving operability in the opening and closing event. Further, since no constraint is imposed for the disposition location of the connector storage compartment 42, it is advantageous to improve the degree of design freedom.

The battery storage compartment 60 and a battery ejecting spring 62 according to the embodiment of the present invention will be described hereinbelow.

Figure 11:
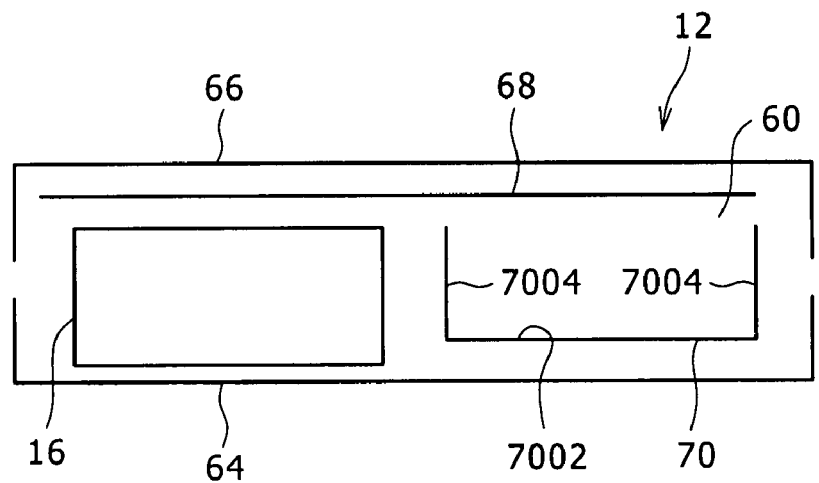
FIG. 11 is a cross sectional view along the line A-A of FIG. 10.
Figure 12:
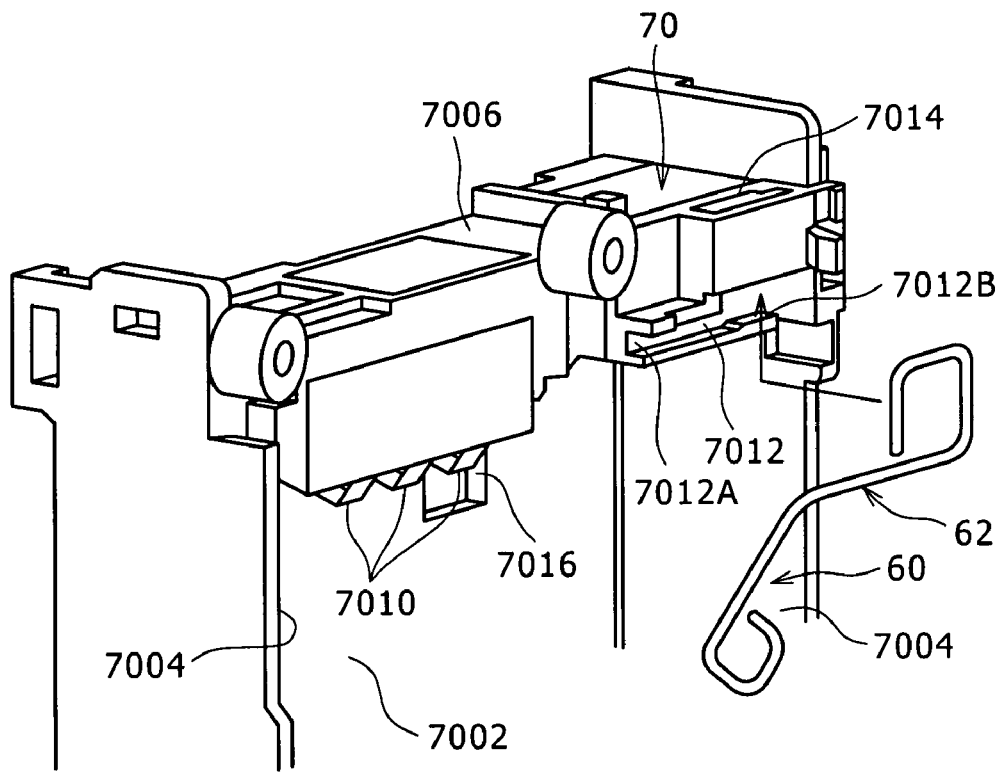
FIG. 12 is a perspective view showing a mounting structure of a battery ejecting spring.
Figure 13:
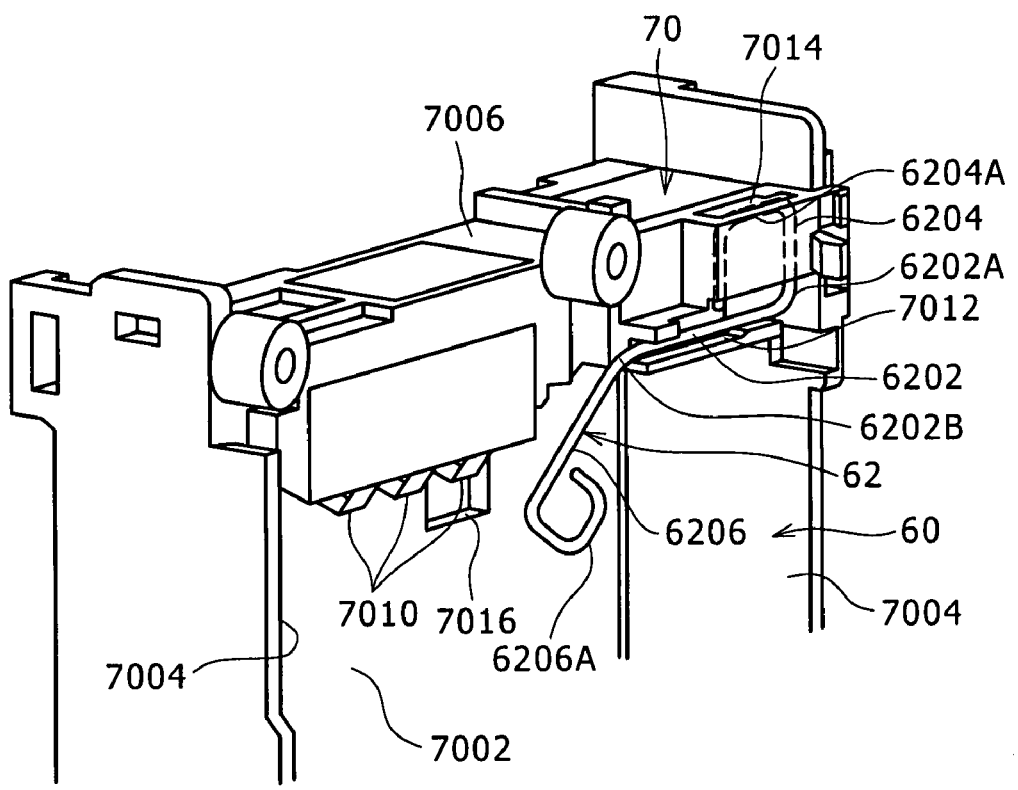
FIG. 13 is a perspective view showing a mounting structure of the battery ejecting spring.

FIG. 10 is a perspective view of a vicinity of the battery storage compartment 60 of the image capture apparatus 10. FIG. 11 is a cross sectional view along the line A-A of FIG. 10. FIGS. 12 and 13, respectively, are perspective views showing a mounting structure of the battery ejecting spring 62. FIG. 14A is a perspective view of the battery ejecting spring 62. FIG. 14B is a view in the direction shown by an arrow B of FIG. 14A. FIG. 14C is a view in the direction shown by an arrow C of FIG. 14B. FIG. 14D is a view in the direction shown by an arrow D of FIG. 14B. FIG. 14E is a view in the direction shown by an arrow E of FIG. 14D.

Figure 15:
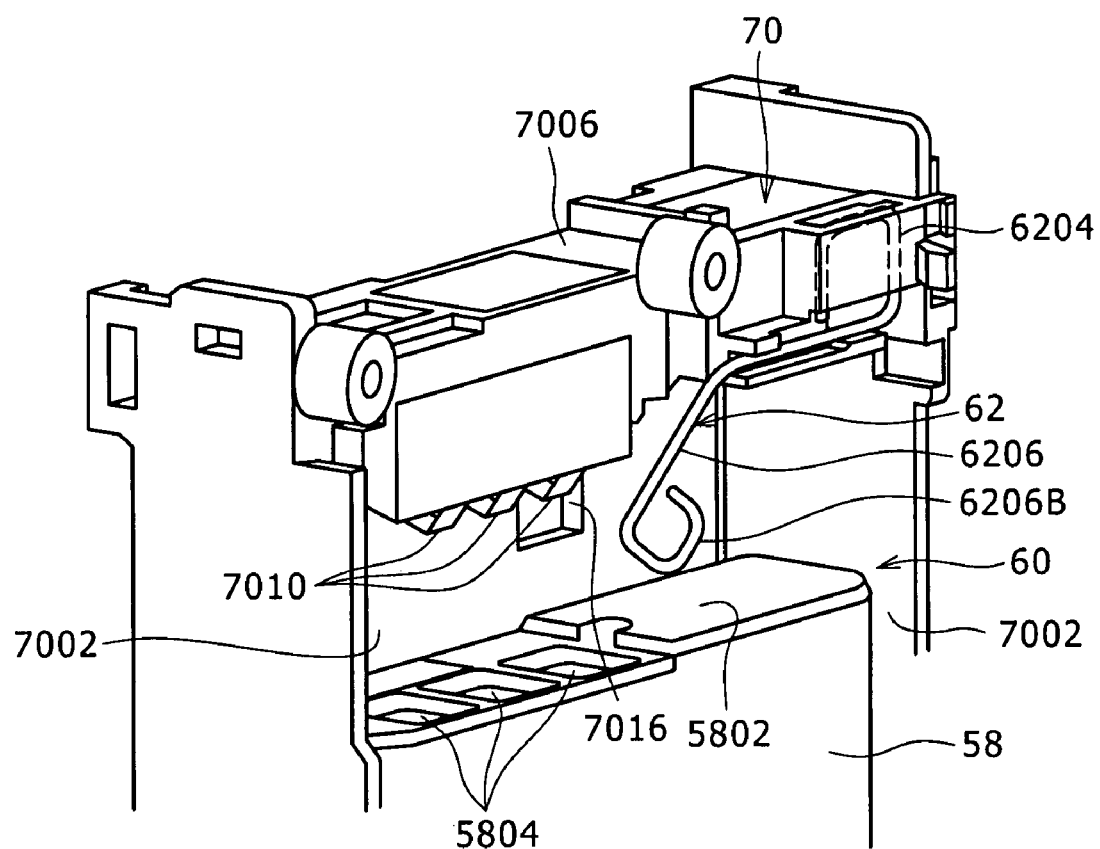
FIG. 15 is a perspective view showing a progressive state where a battery is inserted into a battery storage compartment.
Figure 16:
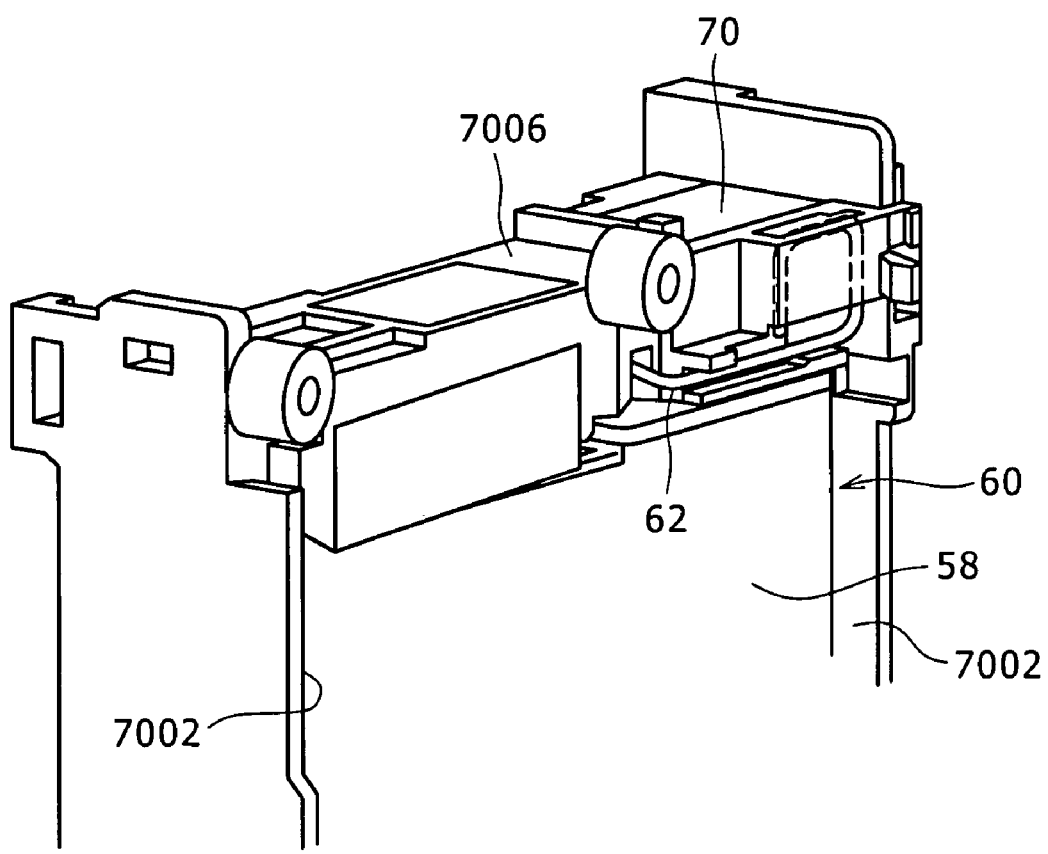
FIG. 16 is an explanatory view showing the state where the battery is stored in the battery storage compartment.

FIG. 15 is a perspective view showing a progressive state of insertion of the battery 58 into the battery storage compartment 60. FIG. 16 is an explanatory view showing the state where the battery 58 has been stored in the battery storage compartment 60. FIGS. 17A to 17C, respectively, are explanatory views showing deflection of the battery ejecting spring 62.

With reference to FIG. 15, the battery 58 is formed into a substantially thin rectangular parallelopiped shape having a thickness and a width and length larger than the thickness.

Three terminals 5804, namely two power supply terminals and one communication terminal, are juxtaposed at a distance from one another in the width direction in one half portion of the front end face 5802, which is one face of the battery 58 in the length direction. The other half portion is formed as a flat face. A rear end face (not shown) or the other face of the battery 58 in the length direction is formed to be a flat face.

The battery storage compartment 60 has a height, width, and depth corresponding to the height, width, and depth of the battery 58. Thus, the battery storage compartment 60 has the height and the width and depth larger than the height. Further, the battery storage compartment 60 is provided so that the height thereof has the same direction as the thickness of the outer housing 12.

With reference to FIG. 11, the outer housing 12 includes a front cover 64 constituting the front face of the outer housing 12; the rear cover 66 coupled to the front cover 64 and constituting the rear face of the outer housing 12; and a thin-plate-like metal chassis 68 formed to extend along the inner face of the rear cover 66. Thus, the chassis 68 extends along the height and width directions of the outer housing 12.

The lens barrel 16 and a synthetic resin housing 70 are provided between the chassis 68 and the front cover 64.

With reference to FIG. 12, the housing 70 includes a bottom wall 7002, sidewalls 7004, a depth-side wall 7006, and an end wall 7008 (FIG. 10). The bottom wall 7002 constitutes the one face of the battery storage compartment 60 in the height direction and has the width and depth of the battery storage compartment 60. The respective sidewalls 7004 elevate from two sides of the bottom wall 7002 in the width direction. The depth-side wall 7006 elevates from one end portion of the bottom wall 7002 in the depth direction, and the end wall 7008 elevates from the other end portion of the bottom wall 7002 in the depth direction.

As shown in FIG. 11, the chassis 68 and the housing 70 are disposed in alignment along the thickness direction of the outer housing 12 so that they are opposite to one another in parallel, tip ends of the sidewalls 7004 on two sides oppose and a tip end of the depth-side wall 7006 oppose the chassis 68, and the end wall 7008 is located on the lower face of the outer housing 12. In the present embodiment, the battery storage compartment 60 is formed from the chassis 68 and the housing 70.

With reference to FIGS. 14A to 14E, the battery ejecting spring 62 includes a linearly extending pivot shaft 6202, an anchor shaft 6204 provided to one end portion 6202A of the pivot shaft 6202, and an urging shaft 6206 provided to the other end portion 6202B of the pivot shaft 6202.

The battery ejecting spring 62 is a torsion spring that is used in the state where the rotation of the one end portion 6202A of the pivot shaft 6202 is stopped by the anchor shaft 6204. Concurrently, the other end portion 6202B of the pivot shaft 6202 is rotated by pivotal movement of the urging shaft 6206 about the pivot shaft 6202 (working as a fulcrum). Thereby, urging forces are developed with torsion of the pivot shaft 6202, and act on the pivot shaft 6202.

In the present embodiment, an end portion of the urging shaft 6206 is formed as a flection portion 6206A that is extended and formed into a flectional shape in a virtual plane in which the urging shaft 6206 pivotally moves about the pivot shaft 6202. Thereby, the flat face of the battery 58 is prevented from being damaged.

Further, in the present embodiment, an end portion of the anchor shaft 6204 is formed as a flection portion 6204A that is extended and formed into a flectional shape in another virtual plane perpendicular to the above-described virtual plane. Thereby, rotation of the one end portion 6202A of the pivot shaft 6202 can be securely stopped.

As shown in FIG. 12, three terminals 7010 (corresponding to electrical contacts in claims) for coupling to three terminals 5804 of the battery 58 are provided in a half portion of the depth-side wall 7006 in the width direction that is separated from the sidewall 7004 of the outer housing 12.

A the pivot shaft receiving groove 7012 for insertion of the pivot shaft 6202 is linearly formed to extend along the width direction of the battery storage compartment 60 in an end portion that exists in the half portion of the depth-side wall 7006 in the width direction on the side of the left sidewall 7004 of the outer housing 12 and that opposes the chassis 68 (i.e., portion on the side of the one end portion of the battery storage compartment 60 in the height direction).

One end portion 7012A of the pivot shaft receiving groove 7012 of the pivot shaft receiving groove 7012 in the extension direction is located in the center of the battery storage compartment 60 in the width direction. An other end portion 7012B of the pivot shaft receiving groove 7012 in the extension direction is located in the vicinity of the sidewall 7004.

Further, an anchor shaft receiving groove 7014 is provided to extend along the depth direction of the battery storage compartment 60, which is the direction perpendicular to the extension direction of the pivot shaft receiving groove 7012. The anchor shaft receiving groove 7014 is thus provided to be coupled to the other end portion 7012B of the pivot shaft receiving groove 7012 in the extension direction. In the present embodiment, as shown in FIGS. 12 to 16, the anchor shaft receiving groove 7014 is provided in a portion close to an angular (or, corner) portion of the end portion in the width direction in a deep portion of the battery storage compartment 60.

A cutout 7016 for securing a large pivotal stroke of the urging shaft 6206 is provided in a portion close to the depth-side wall 7006 in a central portion of the bottom wall 7002.

As shown in FIG. 10, on the end wall 7008, an opening 72 for battery insertion and removal and a memory card insertion and removal slot 74 is provided across the bottom wall 7002, i.e., in a portion opposite to the opening 72 with respect to the bottom wall 7002.

A lid 76 for opening and closing the opening 72 is fitted rotatably via a hinge 7602 in a portion where the battery storage compartment 60 opposes the lower face of the outer housing 12. A lock mechanism for maintaining the closed state in which the battery storage compartment 60 is closed by the lid 76 is provided. Opening of the lock of the lid 76 by the lock mechanism is permitted by opening a lock of the lid 76. For such the lock mechanism, any of various structures known hitherto can be employed.

In a portion of the housing 70 that opposes the opening 72, an engagement crawl 78 is provided to be extendable and retractable into the opening 72 and by being urged along the direction of ejection of the battery 58. Upon engagement of the crawl 78 with the rear end face of the battery 58 stored in the battery storage compartment 60, the stored state of the battery 58 into the battery storage compartment 60 is maintained. On the other hand, upon retraction of the engagement crawl 78, engagement thereof with the rear end face of the battery 58 stored in the battery storage compartment 60 is released, thereby making it possible to remove the battery 58. In this case, retraction of the engagement crawl 78 to the outside of the opening 72 is carried out by using a user's finger.

The disposition of the battery ejecting spring 62 will be described herebelow.

As shown in FIGS. 12 and 13, the pivot shaft 6202 is received by the pivot shaft receiving groove 7012. Thereby, the pivot shaft 6202 is disposed to extend along the width direction of the battery storage compartment 60 in a deep portion of the battery storage compartment 60.

The anchor shaft 6204 is disposed such that the flection portion 6204A thereof is received into the anchor shaft receiving groove 7014, whereby, in the event of pivotal movement of the urging shaft 6206, the rotation of the one end portion 6202A of the pivot shaft 6202 is stopped. In the present embodiment, the anchor shaft 6204 inclusive of the flection portion 6204A extends on the virtual plane perpendicular to the height direction of the battery storage compartment 60.

With the pivot shaft 6202 and anchor shaft 6204 disposed as described above, disposition is carried out such that the urging shaft 6206 is located in the center in the width direction in the deep portion of the battery storage compartment 60. In addition, the flection portion 6206A of the urging shaft 6206 is engageable with the front end face 5802 of the battery 58 that is to be stored in the battery storage compartment 60. In the present embodiment, the urging shaft 6206 inclusive of the flection portion 6206A extends over the virtual plane perpendicular to the width direction of the battery storage compartment 60.

The operation of the battery ejecting spring 62 will be described herebelow.

Upon insertion of the battery 58 into the battery storage compartment 60, as shown in FIGS. 15 and 17A, then the flection portion 6206A of the urging shaft 6206 abuts on the front end face 5802 of the battery 58, as shown in FIG. 17B. Further, as the battery 58 is inserted, the urging shaft 6206 pivotally moves about the pivot shaft 6202.

Then, as shown in FIGS. 16 and 17C, in the state of the battery 58 completely inserted, the half portion of the flection portion 6206A of the urging shaft 6206 deflects outwardly of the battery storage compartment 60.

In the configuration thus formed, rotation of the one end portion 6202A of the pivot shaft 6202 is stopped by the anchor shaft 6204. As such, the other end portion 6202B of the pivot shaft 6202 is rotationally deflected by the urging shaft 6206, such that urging forces generated by torsion of the pivot shaft 6202 act on the battery 58 from the flection portion 6206A of the urging shaft 6206. Thereby, the battery 58 is all time urged along the extension direction thereof from the opening 72.

Consequently, the lid 76 is opened, and the engagement crawl 78 is slid to the outside of the opening 72, thereby allowing the battery 58 to be ejected from the opening 72.

Effects and/or advantages of the present embodiment will be described herebelow.

According to the present embodiment, the battery ejecting spring 62 is configured such that the urging shaft 6206 pivotally moves about the pivot shaft 6202 (working as a fulcrum), and the urging shaft 6206 deflects at a large stroke along the direction of the insertion and removal of the battery 58. Consequently, compared to the related art case using the compression coil spring, a large space need not be provided in the direction of the insertion and removal of the battery 58, but the battery ejecting spring 62 can be disposed. This is advantageous to implement the physical compactness of the battery storage compartment 60.

Further, the battery ejecting spring 62 is configured such that the pivot shaft 6202 is journaled in the pivot shaft receiving groove 7012, and the anchor shaft 6204 is anchored in the anchor shaft receiving groove 7014. According to this configuration, opposing forces of the battery ejecting spring 62 for urging the battery 58 along the extention direction thereof from the opening 72 are mainly received by the anchor shaft receiving groove 7014, but are distributed to act on the pivot shaft receiving groove 7012 and the anchor shaft receiving groove 7014. As such, unlike the related art case, the opposing forces do not locally act on the depth-side wall 7006 of the housing 70. Consequently, for example, the thickness of the wall portion can be increased without taking creep and the like into account, or the synthetic resin housing can be used without using a high-strength material for the wall portion. In addition, the battery storage compartment can be designed without such strength constraints.

Further, in the present embodiment, the anchor shaft receiving groove 7014 is located in the angular (or, corner) portion of the housing 70. The angular (or, corner) portion refers to the portion of intersection of the depth-side wall 7006 and the left sidewall 7004, such that, by nature, the portion has high rigidity. Consequently, the anchor shaft receiving groove 7014 can be formed into a robust structure, the anchor shaft 6204 can be securely anchored, and the one end portion 6202A of the pivot shaft 6202 can be securely stopped from being rotated.

Further, especially in many image capture apparatuses, not only terminals to be coupled to battery terminals, but also structures such as bosses for mounting components are provided in a battery storage compartment, such that the remaining space is narrow. As such, as in the related art case, using a compression coil spring using a large occupied space makes it disadvantageous for implementing the physical compactness of the battery storage compartment. However, according to the present embodiment, the torsion spring is used as the battery ejecting spring 62, such that the occupied space can be reduced, a significant advantage can be obtained for implementing the physical compactness of the battery storage compartment of the image capture apparatus.

In the present embodiment, the three terminals 7010 are disposed in the one portion with respect to the center of the deep portion of the battery storage compartment 60 in the width direction, and the other (remaining) portion of the deep portion in the width direction is a dead space in which the battery ejecting spring 62 is disposed. The configuration thus formed is advantageous for implementing the physical compactness of the battery storage compartment 60 and the image capture apparatus 10.

As above, in the present embodiment, the electronic apparatus has been described with reference to the digital still camera, which is the image capture apparatus. However, the present invention is widely adaptable to any one of electronic apparatuses containing a battery storage compartment, such as video cameras and various other image capture apparatuses, mobile phones, PDAs (personal digital assistants), and notebook personal computers.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
   an outer housing;
   a battery storage compartment provided in the outer housing and having a height and a width and depth larger than the height;
   a cover for opening and closing an opening of the battery storage compartment; and
   a battery ejecting spring disposed in a deep portion of the battery storage compartment and for urging a battery being stored in the battery storage compartment along a direction of ejection of the battery from the opening,
   wherein the battery ejecting spring is a torsion spring including a pivot shaft linearly extending, an anchor shaft provided to one end portion of the pivot shaft, and an urging shaft provided to an other end portion of the pivot shaft, wherein the pivot shaft is supported by a wall portion to extend along the direction of the width ("width direction," hereafter) of the battery storage compartment, the wall portion forming the battery storage compartment;

the anchor shaft is anchored to a wall portion to stop rotation of the one end portion of the pivot shaft, the wall portion forming the battery storage compartment; and the urging shaft includes a tip end opposing the deep portion of the battery storage compartment and engaging with an end face of the battery being stored in the battery storage compartment, thereby to perform a pivotal movement about the pivot shaft working as a fulcrum.

2. An electronic apparatus according to claim 1, wherein the pivot shaft is disposed in a portion close to one end portion of the battery storage compartment in the direction of the height ("height direction," hereafter).

3. An electronic apparatus according to claim 1, wherein:
the pivot shaft is disposed in a portion close to one end portion of the battery storage compartment in the height direction; and
a cutout for relieving the tip end of the urging shaft to the outside of the battery storage compartment in the event of pivotal movement of the urging shaft is provided on a wall surface constituting a portion close to an other end portion of the battery storage compartment in the height direction.

4. An electronic apparatus according to claim 1, wherein:
electrical contacts are provided in one half portion of the battery storage compartment in the width direction in the deep portion of the battery storage compartment;
the pivot shaft extends in a portion close to one end portion of the battery storage compartment in the height direction in an other half portion of the battery storage compartment in the width direction in the deep portion of the battery storage compartment; and
the urging shaft is located in a center of the deep portion of the battery storage compartment in the width direction.

5. An electronic apparatus according to claim 1, wherein:
the anchor shaft is disposed by being received in an anchor shaft receiving groove provided to a wall portion forming the electronic apparatus to thereby stop rotation of the one end portion of the pivot shaft, the anchor shaft being provided in a portion close to an angular portion of an end portion of the battery storage compartment in the width direction in the deep portion of the battery storage compartment.

6. An electronic apparatus according to claim 1, wherein the pivotal movement of the urging shaft about the pivot shaft working as the fulcrum is performed within a virtual plane perpendicular to the width direction.

7. An electronic apparatus according to claim 1, wherein:
the pivotal movement of the urging shaft about the pivot shaft working as the fulcrum is performed within a virtual plane perpendicular to the width direction; and
a flection portion extending on the virtual plane is provided to an end portion of the urging shaft, and the flection portion engages with an end face of the battery being stored in the battery storage compartment.

8. An electronic apparatus according to claim 1, wherein:
the anchor shaft is provided to extend on a virtual plane perpendicular to the height direction; and
a flection portion extending on the virtual plane is provided to an end portion of the anchor shaft.

9. An electronic apparatus according to claim 1, wherein:
the outer housing is formed into a substantially thin rectangular parallelopiped shape having a height and a width and length larger than the height;
the battery storage compartment is provided such that the height thereof has a direction identical to the height of the outer housing;
a thin-plate-like chassis extending along the width direction and length direction of the outer housing and a housing formed from synthetic resin are provided in an interior of the outer housing;
the housing includes a bottom wall, sidewalls, and a depth-side wall, the bottom wall constituting one face of the battery storage compartment in the height direction and having the width and depth of the battery storage compartment, the respective sidewalls elevating from two sides of the bottom wall in the width direction, and the depth-side wall elevating from one end portion of the bottom wall in the depth direction;
the chassis and the housing are disposed in alignment along the height direction of the outer housing so that the chassis and the bottom wall are opposite to one another in parallel, tip ends of the sidewalls on two sides oppose and a tip end of the depth-side wall oppose the chassis; and
the battery storage compartment is formed from the chassis and the housing.

* * * * *